(12) United States Patent
Gustafsson (10) Patent No.: US 7,674,219 B2
(45) Date of Patent: Mar. 9, 2010

(54) DEVICE AND METHOD FOR PRODUCING CONTAINER BLANKS

(75) Inventor: Per Gustafsson, Bjärred (SE)

(73) Assignee: ECO Lean Research & Development A/S, Copenhagen (DK)

( * ) Notice: Subject to any disclaimer, the term of this patent is extended or adjusted under 35 U.S.C. 154(b) by 0 days.

(21) Appl. No.: 10/591,799

(22) PCT Filed: Mar. 23, 2005

(86) PCT No.: PCT/SE2005/000435

§ 371 (c)(1),
(2), (4) Date: Sep. 6, 2006

(87) PCT Pub. No.: WO2005/092601

PCT Pub. Date: Oct. 6, 2005

(65) Prior Publication Data

US 2007/0184956 A1    Aug. 9, 2007

(30) Foreign Application Priority Data

Mar. 26, 2004  (SE)  .................................. 0400784

(51) Int. Cl.
    *B31B 1/64*    (2006.01)
(52) U.S. Cl. ........................ 493/197; 493/202; 493/205; 493/243; 493/254
(58) Field of Classification Search ................. 493/189, 493/193–202, 205, 207–209, 243, 254
    See application file for complete search history.

(56) References Cited

U.S. PATENT DOCUMENTS 3,320,718 A * 5/1967 Thesing ........................ 53/551
3,555,779 A     1/1971 Nemer
3,622,421 A * 11/1971 Cook .......................... 493/194
3,943,683 A *  3/1976 Kovacs et al. ................... 53/51
4,305,240 A * 12/1981 Grevich et al. .............. 493/194
4,614,078 A *  9/1986 Kawabe ...................... 493/208
4,650,530 A *  3/1987 Mahoney et al. ............ 493/194
5,031,385 A *  7/1991 Wada ........................... 53/551
5,092,102 A *  3/1992 James et al. ................... 53/51
5,588,944 A * 12/1996 Achelpohl et al. .......... 493/205
5,964,688 A * 10/1999 Woody et al. ............... 493/207
2004/0106506 A1* 6/2004 Ninomiya et al. ........... 493/189

FOREIGN PATENT DOCUMENTS

DE    1 105 336 B1    4/1961
GB    886531 A        1/1962
WO    WO-02/37897 A1  5/2002

\* cited by examiner

*Primary Examiner*—Stephen F Gerrity
(74) *Attorney, Agent, or Firm*—Birch, Stewart, Kolasch & Birch, LLP (57) ABSTRACT

A device for producing container blanks from a material web having a plurality of tools supported by a rotary tool holder. The tool holder is on rotation arranged to move each tool along a working path along which each tool is engageable with the material web for joining of opposite wall portions of the material web along connecting portions, and a return path along which each tool is disengageable from the material web. Each tool is arranged to be moved together with the material web when the tool is moved along the working path and the tool holder acts as a deflector for the material web when this moves together with the respective tools along the working path. The present invention also relates to a corresponding method for producing container blanks.

19 Claims, 4 Drawing Sheets

DEVICE AND METHOD FOR PRODUCING CONTAINER BLANKS

FIELD OF THE INVENTION

The present invention relates to a device and a method for producing container blanks and, more specifically, such a method and device where opposite wall portions of a material web are joined along connecting portions.

BACKGROUND ART

WO99/41155 discloses a device for making container blanks by joining opposite wall portions of a material web along connecting portions.

The material web comprises two side wall webs which are passed in a parallel opposite relationship along a manufacturing line and, between them, a bottom wall web folded in two. The webs are thus brought together to a common material web and sealed to each other along said connecting portions by means of heating jaws which engage the material web.

While the heating jaws engage the material web, the web must be kept stationary, which means that the method for producing the container blanks will be intermittent.

The intermittent method of production affects the production capacity which in some cases can be insufficient.

Different solutions for increasing the production capacity have been suggested.

For example, a shaped roller forming a nip together with a back-pressure roller can be used. The material web is passed through the nip, and the shaped roller engages to form said connecting portions. The method allows continuous production of container blanks.

For the container blanks to form liquid-tight containers in the filled state, it is important for the connecting portions to be reliable, i.e. that the sealing process is allowed to take place for a sufficient period of time. To provide this, a plurality of such nips can be arranged in succession, which for obvious reasons requires accurate synchronization and, thus, complicated adjustment.

However, there is a need for an alternative method which allows continuous production of container blanks.

SUMMARY OF THE INVENTION

In view of that stated above, the object of the present invention is to provide an alternative device and an alternative method for producing container blanks by joining opposite wall portions of a material web along connecting portions.

A further object is to provide such a device and method which allow continuous production of container blanks of said type.

Another object of the present invention is to provide such a device and method which allow rational production of container blanks.

It is also an object of the invention that the device and the method allow production of container blanks with reliable connecting portions.

More specifically, there is provided according to the present invention a device for producing container blanks from a material web, comprising a plurality of tools supported by a rotary tool holder, which on rotation is arranged to move each tool along a working path along which each tool is engageable with the material web for joining of opposite wall portions of the material web along connecting portions, and a return path along which each tool is disengageable from the material web, each tool being arranged to be moved together with the material web when the tool is moved along said working path, and said tool holder acting as a deflecting means for the material web when this moves together with the respective tools along said working path.

This results in an alternative device for producing container blanks.

The inventive device allows continuous production of container blanks since the tools during their engaging phase are moved together with the material web along said working path. However, it will be appreciated that the device can also be driven intermittently, for instance, by indexing the motion of the tool holder.

The inventive device can also be made to exhibit an advantageously high production capacity. The reason for this is that the tools are moved by rotation of the tool holder, and by arranging the tools at a suitable radial distance from the centre of rotation of the tool holder, the speed at which the tools are moved can, at a given speed of rotation, be adjusted to the desired feed rate of the material web.

The device also allows production of container blanks with reliable connecting portions to provide liquid-tight container blanks. The reliability of the connecting portions is a function of the required sealing time, by which is meant the period of time during which each tool must engage the material web for a reliable sealing portion to be formed. The inventive device can provide the required sealing time since the tool holder acts as a deflecting means for the material web when this is moved together with the tools along the working path. The tools are moved by rotation of the tool holder, thereby making it possible to provide the required sealing time for a given sealing temperature by suitable adjustment of the speed at which the tool is moved and the distance along which the tool is moved. Said speed is a function of the speed of rotation of the tool holder and the radial distance of the tool from said centre of rotation, while said distance is a function of said radial distance and the extent of the working path.

According to an embodiment of the inventive device, each tool is operable between a closed position and an open position, the tool being moved to said closed position to provide said engagement with the material web. Each tool may comprise a base element which is fixedly mounted on the tool holder and an engaging element which is pivotable relative to the base element. One of the base element and the engaging element of each tool can support a rib, which is arranged to engage the material web in the closed position of the tool, in which case said rib of each tool can have an extent that corresponds to the extent of the connecting portion of a container blank.

The rib can be supported by an arrangement involving springs, which when moving the tool to said closed position are arranged for a given compression. By a suitable adaptation of said springs, the force by which the tool is closed can thus be adjusted.

According to another embodiment, each tool is arranged to provide said joining by heat sealing.

According to yet another embodiment, the device comprises a control means which is arranged to engage said tool with, and disengage the same from, the material web. The control means may comprise a link mechanism for each of the tools and a stationary cam structure, each tool being connected to the cam structure by said link mechanism and the cam structure being arranged, during rotation of the tool holder, to control each tool to be closed and opened, respectively. By using a single cam structure for operating all tools, the individual tools are controlled in a simple and cost-effective manner. Each link mechanism may comprise an articulated link arm which is arranged in an over-centred position.

As a result, each tool can be made to be openable even if an unplanned stoppage should occur when the tool is positioned along said working path.

Each link mechanism may also comprise a roll which is held in a cam groove of the cam structure, a sensor being arranged in the cam groove for sensing the force by which the roll abuts against a bearing surface of the cam groove. This makes it possible to monitor the sealing force, i.e. the force by which the tool engages the material web, since this force is proportional to said abutting or contact force. The contact force of the roll can alternatively be sensed by means of a weakening in the cam groove, in which case the magnitude of the elastic deformation of the weakening is measured as the roll passes. Based on the magnitude of the elastic deformation, the force by which the roll abuts can easily be calculated.

According to another embodiment, the tool holder can be rotatably mounted on one side. The fact that the tool holder is mounted on one side only gives the advantage that the other side will be easy of access, which facilitates, for instance, service and tool changing.

According to one more embodiment, the device comprises a punching station, which is arranged downstream of the tool holder and arranged to punch container blanks along said connecting portions. The punching station can be arranged for such punching that a succession of container blanks are connected to each other to form a continuous web of container blanks.

In another embodiment, the device comprises a registering mechanism positioned upstream of the tool holder and adapted to sense the tension in the material web and to adjust said tension according to a predetermined value.

Furthermore, according to the present invention, a method is provided for producing container blanks from a material web by joining opposite wall portions of the material web along connecting portions, comprising deflecting said material web over a tool holder, rotating the tool holder to move tools supported by the same along a working path, and, by continued rotation of the tool holder, moving the tools along a return path to the beginning of said working path, each tool, for providing said joining, being engaged with the material web and moved together with said material web during the movement of the tool along said working path.

According to one embodiment of the inventive method, the material web is folded to a web folded longitudinally in the form of a W.

According to yet another embodiment, each tool is engaged with the material web by pivoting an engaging element downwards to a base element for clamping the material web therebetween.

The tool holder is rotated continuously to provide continuous production of container blanks. The tool holder can also be rotated in an indexing motion.

Embodiments of the present invention will in the following be described for the purpose of exemplification with reference to the accompanying drawings.

DESCRIPTION EMBODIMENTS

Figure 1:
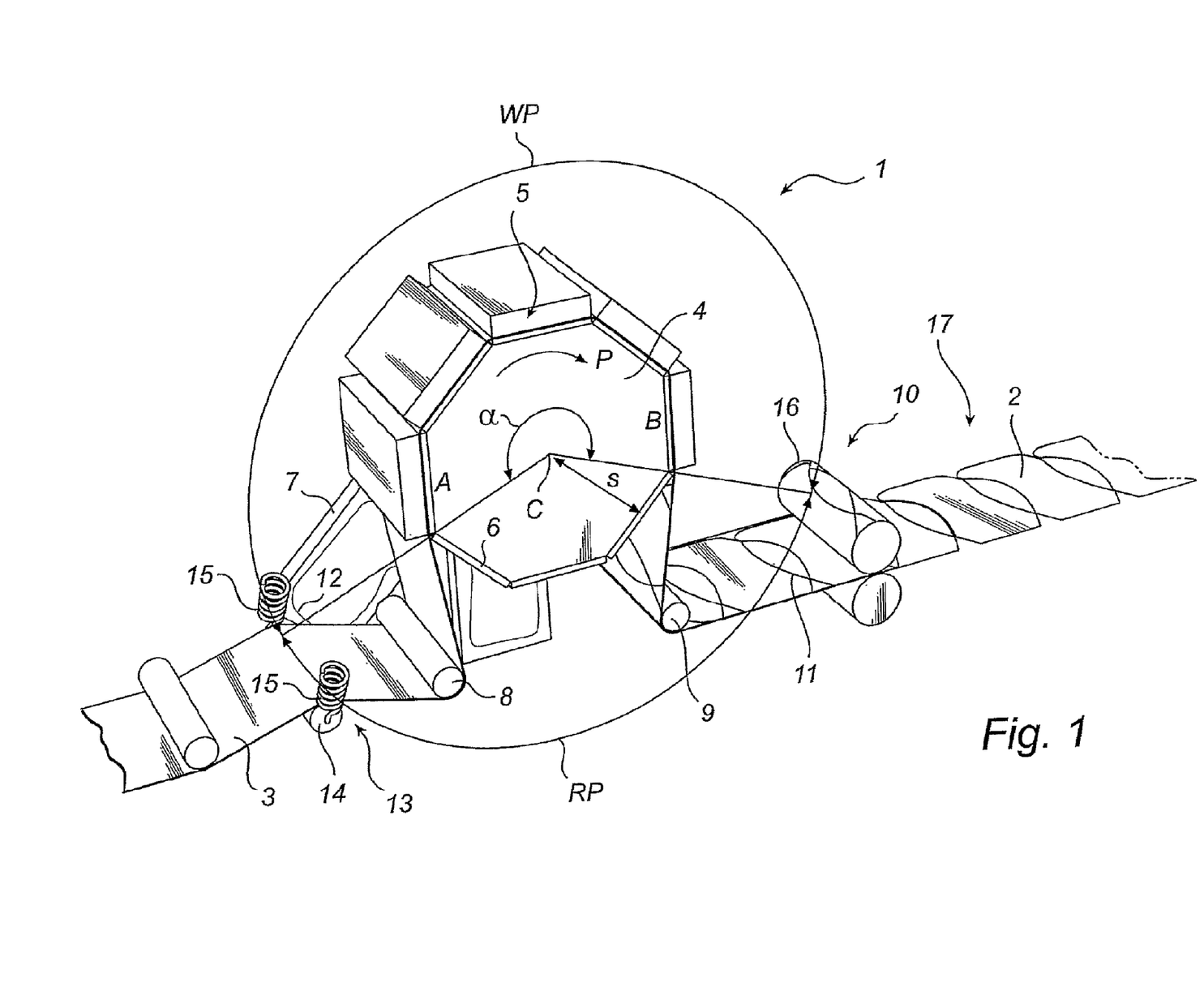
FIG. 1 is a schematic perspective view of an inventive device for producing container blanks.

FIG. 1, to which reference is made, illustrates schematically an embodiment of an inventive device 1 for producing container blanks 2 from a material web 3.

The device 1 is adapted to produce container blanks 2 by joining opposite wall portions of a material web 3. The material web 3 is obtainable in various designs. For example, it is possible to let the material web be a web folded longitudinally in the form of a W. A container blank produced from such a material web will obtain two side walls from the outer lateral portions of the web and a bottom wall from the central portion, folded in two, of the web. It is also possible to produce such a container blank from a material web comprising two separate webs and, arranged therebetween, a bottom forming web folded in two.

The material web 3 from which said container blanks 2 are produced advantageously consists of a container laminate with a core layer comprising a binder of polyolefin and a filler of mineral material such as chalk.

The device 1 comprises a rotatably arranged tool holder 4 which supports a number of tools 5. In the embodiment shown, the tool holder 4 has an octahedral structure where a tool 5 is arranged along the respective sides of the structure. The tool holder 4 is supported by and rotatably mounted in a frame (not shown). In one embodiment (not shown) the tool holder can be rotatably mounted on one side. In such an embodiment, a mounting means is arranged on one side only of the tool holder, which means that the opposite side of the tool holder is easily accessible, for instance, for service and tool changing.

By rotation of the tool holder 4, the tools 5 are movable along a path which comprises a working path and a return path, which are indicated at WP and RP.

Each tool 5 comprises a base element 6 and an engaging element 7. The base element 6 is fixedly mounted in the tool holder 4 and the engaging element 7 is pivotally arranged relative to the base element 6. As can be seen in the figures, the base elements 6 of the tools 5 form a substantially continuous section enclosing the rotary tool holder. For closing of the tool 5, the engaging element 7 is thus pivoted downwards into abutment against the base element 6.

The device 1 also comprises a control means (not shown in FIG. 1) for opening and closing of the tools 5. More specifically, the control means is arranged to close the tools 5 as they are being moved along said working path WP and open the tools 5 as they are being moved along said return path RP.

In operation of the device 1, a material web 3 is passed over a first deflecting roller 8 arranged upstream of the tool holder 4 and further over the base elements 6 of the tools 5 which are positioned along said working path WP. According to the embodiment shown, the material web 3 is then passed over a second deflecting roller 9 arranged downstream of the tool holder 4 and further to a subsequent station in the form of a punching station 10.

The tool holder 4 thus acts as a deflecting means for the material web 3.

When the material web 3 is fed towards the tool holder 4, it first reaches the beginning of the working path WP, said beginning being indicated in position A, and the tool 5 located in said position A is closed by the control means which thus provides downward pivoting of the engaging element 7.

As a result, the tool 5 will engage the material web 3, which engagement is maintained during rotation of the tool holder in the direction indicated by arrow P for moving the tool 5 to the end of the working path WP, which end is indicated in position B.

As the tool 5 moves from position A to position B, the tool 5 will thus be moved together with the material web 3 and engage the material web 3 for joining opposite wall portions along a connecting portion, which is indicated at 11.

At the same time the subsequent tool 5 will along the working path WP engage subsequent portions of the material web 3 for providing connecting portions 11 in the same way.

Once in position B, the control means is arranged to open the tool 5, and in the shown embodiment this is provided by pivoting the engaging element 7 upwards.

By continued rotation of the tool holder 5 in the direction of arrow P, the tool 5 will be moved along said return path RP back to the beginning of the working path WP, position A, where the tool 5 is again prepared to engage a portion of the material web 3.

The tools 5 can be arranged to provide said connecting portions 11 in different ways. In the embodiment shown, the engaging element 7 supports a rib 12 having an extent corresponding to a connecting portion 11, which rib 12 is arranged to engage the material web 3 to provide said connecting portion 11 in the container blank 2 by heat sealing. However, it will be appreciated that the rib 12 could also be supported by the base element 6, or that the base element 6 as well as the engaging element 7 support the rib 12.

The material web 3 is advantageously made of a laminate with an inside-forming surface layer having a melting point which is lower than the melting point of an outside-forming surface layer of the laminate. Thus by choosing a suitable sealing temperature and time, it will be possible to produce container blanks 2 from a web folded in the form of a W, or a web comprising two separate webs and, arranged therebetween, a web folded in two, without opposing outsides of the container blank 2 adhering to each other.

According to the present invention, container blanks 2 are thus produced by means of tools 5 which are kept substantially stationary in relation to a material web 3, whether this is stationary or continuously fed.

It is thus possible to let the inventive device 1 act as a deflecting means for a continuously fed material web 3, which for obvious reasons enables a higher production capacity since it would be possible to avoid intermittent operation. However, it will be appreciated that the inventive device 1 can also be operated intermittently, if desired. For example, it is conceivable to arrange the tool holder 4 so as to be rotated in an indexing motion instead of being rotated continuously.

For the provision of uniform container blanks 2, it is most important for the tension in the material web 3 to be kept substantially constant in operation. For this reason, the shown embodiment of the inventive device 1 comprises a registering mechanism 13, which is arranged downstream of the first deflecting roller 8.

In the embodiment shown, the registering mechanism 13 comprises a roll 14, over which the material web 3 runs and whose contact pressure against the material web 3 can be varied by an adjusting means 15, and a sensor (not shown) for measuring the tension in said material web 3. The registering mechanism 13 is arranged to compare the value of the tension, detected by the sensor, with a predetermined value and after that adjust the contact pressure of the roll 14 by the adjusting means 15 so that it substantially corresponds to the predetermined value.

Downstream of the tool holder 4, a punching station 10 is, as mentioned above, arranged to punch the completed container blanks 2 from the material web 3 along said connecting portions 11. In the shown embodiment, said punching station 10 comprises a roll punch 16 which is arranged for such punching that two successive container blanks 2 are connected to each other to form a continuous web 17 of container blanks 2. This web 17 of container blanks 2 can then be rolled up to be supplied in the form of rolls to the users.

For the necessary strength of the connecting portions 11, it is important for the sealing time to be sufficiently long. This means that each tool 5, at a given sealing temperature, must maintain its engagement with the material web 3 for a prescribed period of time, usually 1-2 s.

The inventive device 1 allows production of container blanks 2 at a relatively high production capacity and with reliable connecting portions 11.

The high production capacity is due to the fact that the device 1 allows continuous operation. More specifically, the tools 5 are moved by rotation of the tool holder 4, and by arranging the tools 5 at a suitable distance S from a centre of rotation C of the tool holder 4, the speed at which the tools 5 are moved can, at a given speed of rotation, be adjusted to the desired feed rate of the material web 3.

In spite of said high production rate, production of container blanks 2 with reliable connecting portions 11 is still allowed, which means that the resulting containers are liquid-tight in the filled state. By the tool holder 4 of the device 1 acting as a deflecting means for the material web 3, sufficiently long sealing times can in fact be achieved. The sealing time is at a given sealing temperature a function of speed and distance. Said distance is substantially the extent of said working path WP which is dependent on the one hand on how large part α of the revolution of the tool holder 4 is arranged as the working path WP and, on the other hand, the distance S of the tools 5 from the centre of rotation C of the tool holder 4. In the device 1 shown in FIG. 1, the working path WP corresponds approximately to half the revolution of the tool holder 4. Said speed is a function of said distance S to the centre of rotation C and the speed of rotation of the tool holder 4. By adjusting the variables speed of rotation of the tool holder 4, distance S of the tools 5 to the centre of rotation C, and the extent of the working path WP, the required sealing time can thus be achieved.

The tool holder 4 illustrated in FIG. 1 has for the sake of clarity been given the form of an octahedral structure. It will be appreciated, however, that the tool holder 4 can also be given other designs. For instance, the tool holder 4 can be given the form of a 36-sided structure with a diameter of about 2 m, which means that the distance S of the tools 5 to the centre of rotation C will be about 1 m. The tool holder 4 thus supports 36 tools and an inventive device 1 comprising such a tool holder 4 is capable of producing about 55,000 container blanks 2 an hour, provided that each container blank 2 has a width of about 150 mm in the longitudinal direction of the material web 3 and that the sealing time of each tool 5, i.e. the time it takes for the tool 5 to travel along the working path WP, is about 1.5 s.

In accordance with that mentioned above, the inventive device 1 comprises a control means which controls closing and opening of the tools 5 while the tools 5 by rotation of the tool holder 4 are moved along said working path WP and return path RP. This control means can be designed in various ways, and FIGS. 2 and 3, to which reference is now made, illustrate an embodiment of a control means 18.

Figure 2:
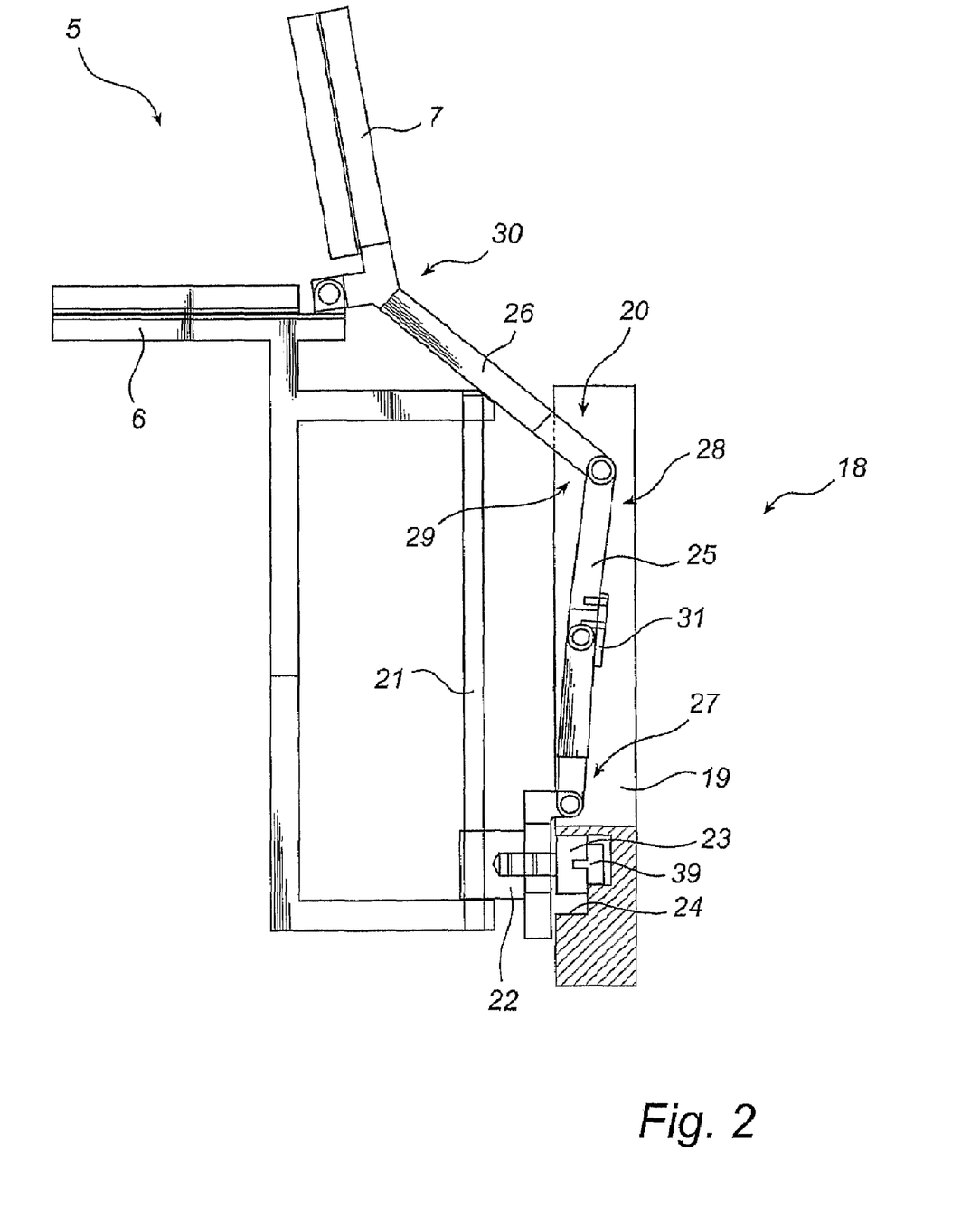
FIG. 2 is a schematic side view of a control means for opening and closing of a tool supported by a tool holder of the inventive device, the control means being shown in a position corresponding to the open position of the tool.
Figure 3:
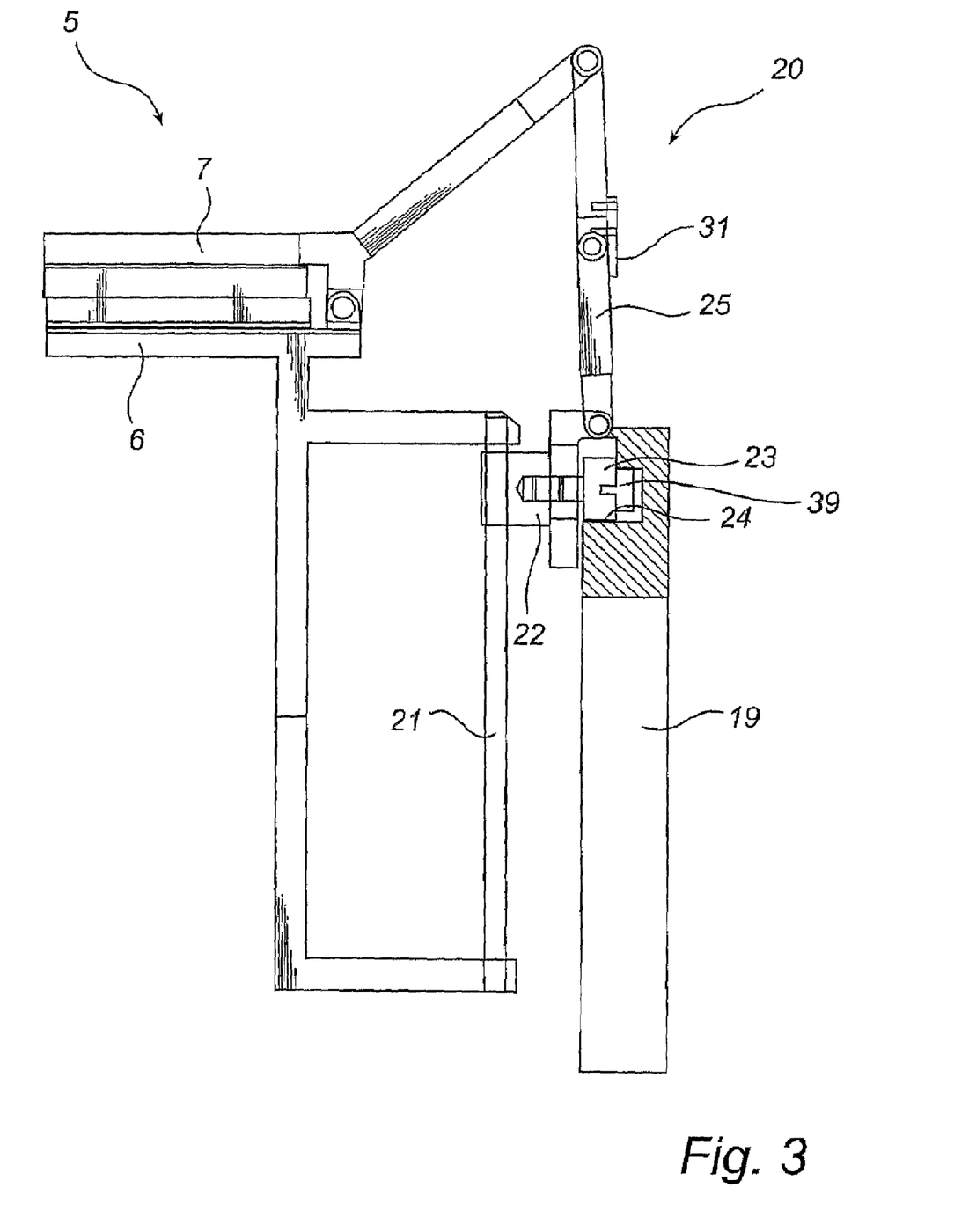
FIG. 3 is a schematic side view of the control means in FIG. 2, the control means being shown in a position corresponding to the closed position of the tool.

The control means 18 comprises a stationary cam structure 19 and a link mechanism 20 which is actuated by the same and connected to the pivotable engaging means 7 of a tool 5.

The link mechanism 20 comprises a holder 22 which is movable along a bar 21, the cam structure 19 being arranged to control the movement of the holder 22 along said bar 21. To this end, the holder 22 comprises in the shown embodiment a first and a second roll 23, 39 which are held in a cam groove 24 of the cam structure 19. The second roll is rotatably fixed to the first roll. By rotation of the tool holder 4, the rolls 23, 29 of the holder 22 of the control means 18 will thus be moved along the cam groove 24, whereby the holder 25 is made to move along the bar 21 as a function of the profile of the cam groove 24.

The link mechanism 20 further comprises a first 25 and a second 26 link arm. A first end 27 of the first link arm 25 is articulated to the holder 22 and a second end 28 of said first link arm 25 is articulated to a first end 29 of the second link arm 26. A second end 30 of the second link arm 26 is finally fixedly connected to the engaging element 7 of the tool 5.

FIG. 2 shows the holder 22 of said link mechanism 20 in a lower end position, in which the tool 5 is open, i.e. the engaging element 7 is in its upwardly pivoted position relative to the base element 6 of the tool 5. The cam groove 24 of the cam structure 19 is thus formed with such a profile that the tool 5 is open when moved along the above-described return path RP.

When the tool 5 by rotation of the tool holder 4 has been moved to position A, i.e. to the beginning of the above-described working path WP, the control means 18 is arranged to close the tool 5, which thus means that the engaging element 7 is moved to its downwardly pivoted position relative to the base element 6. This is achieved according to the embodiment shown by moving the holder 22 of the link mechanism 20 to an upper end position, which is shown in FIG. 3 and thus means that said cam groove 24 has a profile for performing such a movement. Further the cam groove 24 is designed so that the tool 5 remains in its closed position when the tool 5 is moved along the working path WP to position B.

By the use of a cam structure 19 in combination with link mechanisms 20 which are connected to the respective tool 5, a control means 18 is provided, which in a reliable, simple and cost-effective manner can be made to control the tools 5 as desired.

In the embodiment shown in FIGS. 2 and 3, the first link arm 25 is articulated in its centre and arranged in an over-centred position which is defined by a stop lug 31. The over-centred first link arm 25 will thus act as a rigid link arm in normal operation. In case of production disturbances causing stoppage, the design of said first link arm 25 allows the tool 5, if positioned along said working path WP, to be opened. More specifically, this is provided by the first link arm 25 being moved from its over-centred position and pivoted in its centre. By the tools 5 being openable in the way described above, opening of the tools 5 is allowed in case of unplanned stoppages, which eliminates the risk of burning owing to excessive exposure of the material web 3 to heat.

Figure 4:
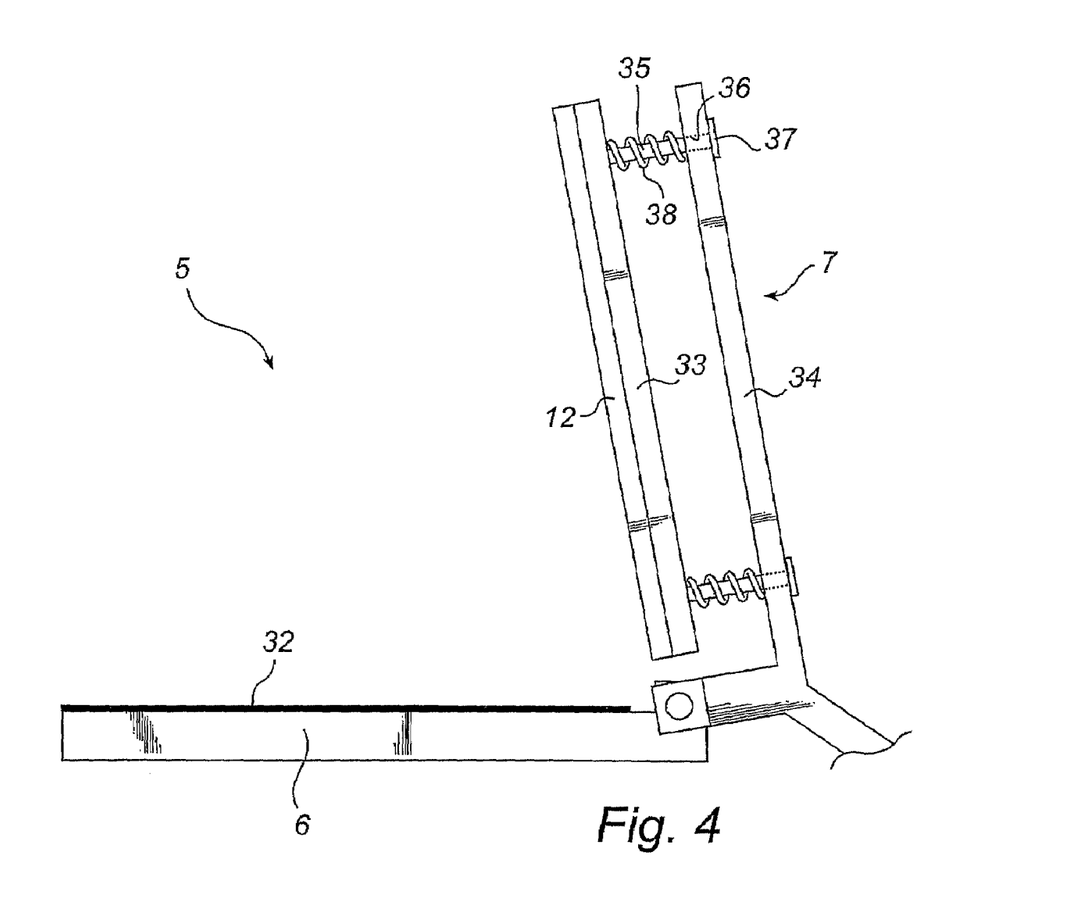
FIG. 4 is a schematic side view of a tool of the inventive device in an open position.
Figure 5:
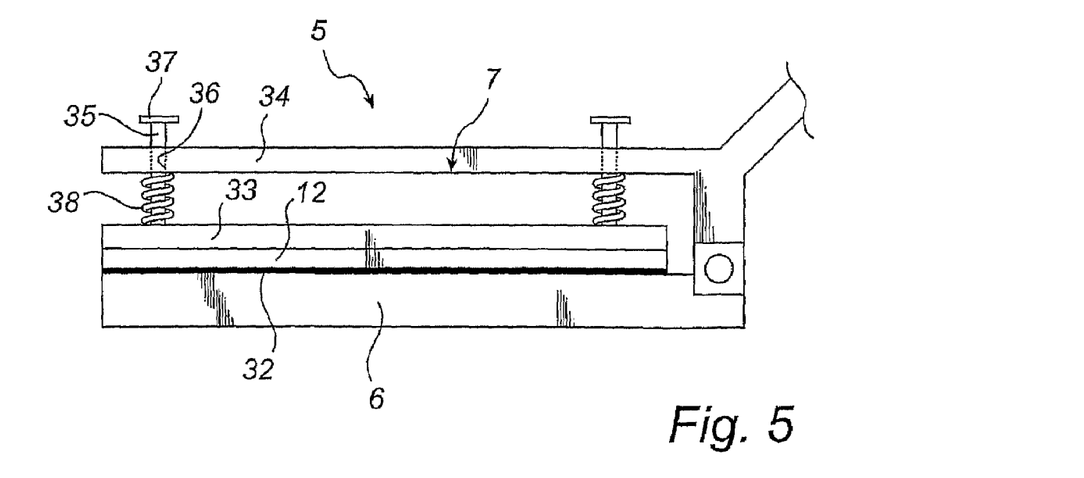
FIG. 5 is a schematic side view of the tool in FIG. 4 in a closed position.

According to one embodiment, the inventive device 1 comprises tools 5 of the type shown in FIGS. 4 and 5.

The tool 5 comprises, as described above, a base element 6 and an engaging element 7.

The base element 6 has a back-pressure structure 32 facing the engaging element 7 in its downwardly pivoted position relative to the base element 6. The back-pressure structure 32 may consist of, for instance, a rubber sheet. To obtain plane abutment, the back-pressure structure 32 is arranged in a plane coinciding with the axis about which the engaging element 7 is pivotable.

The engaging element 6 has a profile structure 33 facing the base element 6 in the downwardly pivoted position of the engaging element 7 relative to the base element 6. More specifically, the profile structure 33 comprises a projecting rib 12 of the type which has been described above and which thus has an extent corresponding to the connecting portion 11 of a container blank 2. The base element 6 can also have a design which is complementary to the engaging element 7, i.e. both the engaging element 7 and the base element 6 comprise a projecting rib 12 of the type described above.

The engaging element 7 also comprises heating means (not shown), which are adapted to heat the rib 12 to allow joining of the opposite wall portions along the desired connecting portion 11 by heat sealing.

The profile structure 33 is supported by a carrier structure 34 of the engaging element 7. In the embodiment shown, the profile structure 33 is provided with a number of pins 35 on its side facing the carrier structure 34. The pins 35 extend through holes 36 formed in the carrier structure 34 and support stop washers 37 at their outer ends on the other side of the carrier structure 34.

Springs 38 are arranged around the pins 35 and positioned between the profile structure 33 and the carrier structure 34. The springs 38 can be biased, in which case the magnitude of the bias is adjusted by the positioning of said stop washers 37.

The engaging element 7 is arranged in relation to the base element 6 so that the springs 38, when the engaging means 7 has been moved to its downwardly pivoted position, are compressed to a predetermined extent. The force by which the profile structure 33 is applied to the back-pressure structure 32 thus depends on the current spring constants and, possibly, the bias imparted to the springs 38. This arrangement of the pins 35 and springs 38 aims at providing a predetermined sealing force since the required sealing time is a function of temperature and precisely sealing force.

To provide satisfactory connecting portions 11, it is in some cases important for the sealing force to be optimally distributed along the entire rib 12. This can be provided by a suitable choice of bias or spring constant of the individual springs 38.

In accordance with that described above, it is important for a required sealing force to be provided during the engagement of the respective tools 5 with the material web 3. It has also been described above how this sealing force is provided by an arrangement involving springs 38 which during the engagement of the tool 5 with material web 3 are compressed to a predetermined extent. It will be appreciated that the required sealing force would be lost, for instance, if one of the springs 38 should break. In operation of the inventive device 1, this would in turn result in inferior quality of the connecting portions 11 which are provided by the tool 5 in question, which could result in container blanks 2 that are not tight. According to an embodiment of the present invention, the device 1 comprises to this end a pressure sensor (not shown) which is arranged in the cam groove 24 of the cam structure 19 in that part of the groove 24 which corresponds to the working path WP of the tools 5. Each roll 23 of the respective link mechanisms 20 will then pass the sensor, whereby the contact force of the roll 23 against the pressure sensor is registered. This contact force is proportional to the sealing force, and by comparing the current contact force with a predetermined value of said contact force it will thus be possible to discover inaccuracies, such as breakdown, in the arrangement involving springs 38. The contact force of the roll can also be read by means of a weakening in the cam groove 24 of the cam structure 19, the magnitude of the elastic deformation of the weakening being measured as the roll 23 passes. The magnitude of the deformation is proportional to the contact force of the roll 23, which force can be measured without an additional part having to be positioned in the cam groove.

In an embodiment (not shown) the profile structure is replaceable. The replaceability gives the advantage that different container forms can be produced by one and the same machine. One way of replaceably attaching the profile structure is to use a modified keyhole lock. In the back of the profile structure, i.e. the side facing away from a container, a number of keyhole holes are formed. By keyhole hole is meant a hole with which a pin can cooperate so that the pin can be inserted into the hole in a first direction and then be moved in a second direction to lock the pin from being moved in the first direction. On a frame, which is arranged to carry the profile structure, a number of pins are axially movably arranged, the location of the pins corresponding to the location of the keyhole holes. The pins are biased by means of springs pressing the profile structure against the frame when the pins are inserted into the keyhole holes. When the profile structure is to be replaced, a power source, such as a compressed-air source, is activated, said power source acting to move the pins in a direction opposite to said bias. The movement of the pins makes it possible to easily remove the profile structure, after which another profile structure can be mounted. Owing to the construction, considerable savings of time and labour can be achieved in service and exchange of the profile structures, compared with the case that each profile structure should be fastened by, for instance, screws.

According to the present invention, a device for producing container blanks from a material web thus is provided. The device comprises a rotary tool holder supporting tools, which are adapted to engage the material web and to be moved together with said material web along a working path under maintained engagement to join opposite wall portions of the material web along connecting portions. Moreover the tool holder acts as a deflecting means for the material web. As a result, a device is provided, which allows continuous production of container blanks at high production rates, although it is appreciated that the inventive device can also be operated intermittently.

It will be appreciated that the present invention is not limited to the shown embodiments.

For example, the control means for opening and closing of the tools can be provided in other ways.

It is also conceivable to arrange the tools for another type of joining of the opposite wall portions along connecting portions than by heat sealing.

Consequently several modifications and variations are conceivable, which means that the present invention is exclusively defined by the appended claims.

The invention claimed is:

1. A device for producing empty container blanks from a material web W-folded in the longitudinal direction, comprising:
   a plurality of tools supported by a rotary tool holder, each tool comprising a base element which is fixedly mounted on the tool holder and an engaging element which is pivotable relative to the base element,
   wherein base elements of the tools form a substantially continuous section enclosing the rotary tool holder,
   said rotary tool holder is on rotation being arranged to move each tool along
   a working path along which each tool is engageable with the material web for both transversal and longitudinal joining of opposite wall portions of the longitudinal W-folded material web along connecting portions outlining said container blanks, and
   a return path along which each tool is disengageable from the material web,
   each tool being arranged to be moved together with the material web when the tool is moved along said working path, and
   said tool holder acting as a deflecting means for the material web when the tool holder moves together with the respective tools along said working path.

2. A device as claimed in claim 1, in which each tool is operable between a closed position and an open position, the tool being movable to said closed position to provide said engagement with the material web.

3. A device as claimed in claim 1, in which at least one of the base element and the engaging element of each tool supports a rib, which is arranged to engage the material web in the closed position of the tool.

4. A device as claimed in claim 3, in which said rib of each tool has an extent that corresponds to the extent of the connecting portion of a container blank.

5. A device as claimed in claim 3 or 4, in which said rib is supported by an arrangement involving springs, which when moving the tool to said closed position are arranged for a given compression.

6. A device as claimed in claim 1, in which each tool is arranged to provide said joining by heat sealing.

7. A device as claimed in claim 1, further comprising a control means which is arranged to engage said tool with, and disengage the same from, the material web.

8. A device as claimed in claim 7, in which the control means comprises a link mechanism for each of the tools and a stationary cam structure, each tool being connected to the cam structure by said link mechanism and the cam structure (16) being arranged, during rotation of the tool holder, to control each tool to be closed and opened, respectively.

9. A device as claimed in claim 8, in which each link mechanism comprises a roll which is held in a cam groove of the cam structure, a sensor being arranged in the cam groove for sensing the force by which the roll abuts against a bearing surface of the cam groove.

10. A device as claimed in claim 7, in which each link mechanism comprises an articulated link arm which is arranged in an over-centred position.

11. A device as claimed in claim 1, in which the tool holder is rotatably mounted on one side.

12. A device as claimed claim 1, further comprising a punching station, which is arranged downstream of the tool holder and arranged to punch container blanks along said connecting portions.

13. A device as claimed in claim 12, in which said punching station is arranged for such punching that a succession of container blanks are connected to each other to form a continuous web of container blanks.

14. A device as claimed in claim 1, in which the tool holder in operation is arranged for continuous rotation.

15. A device as claimed in claim 1, further comprising a registering mechanism positioned upstream of the tool holder and adapted to sense the tension in the material web and to adjust said tension according to a predetermined value.

16. A method for producing empty container blanks from a material web W-folded in the longitudinal direction by joining both transversally and longitudinally opposite wall portions of the longitudinally W-folded material web along connecting portions outlining said container blanks, comprising deflecting said material web over a tool holder, rotating the tool holder to move tools supported by the same along a working path, and by continued rotation of the tool holder, moving the tools along a return path to the beginning of said working path, each tool, for providing said transversal and longitudinal joining of opposite wall portions of the longitudinally W-folded material web along connecting portions outlining said container blanks, being engaged with the material web by pivoting an engaging element towards a base element for clamping the material web therebetween, the base elements of the tools form a substantially continuous section enclosing the rotary tool holder, and being moved together with said material web during the movement of the tool along said working path.

17. A method as claimed in claim 16, wherein the material web is folded to a web folded longitudinally in the form of a W.

18. A method as claimed in claim 16, in which said tool holder is rotated continuously to provide continuous production of container blanks.

19. A method as claimed in claim 16, in which the tool holder is rotated in an indexing motion.

* * * * *